April 3, 1951 E. W. C. RUSSELL 2,547,838

RECORD BEARING MEDIUM AND METHODS OF PREPARATION

Filed Nov. 26, 1948

Inventor:

Edward W.C. Russell,

By Mauro & Lewis

ATTORNEYS

Patented Apr. 3, 1951

2,547,838

UNITED STATES PATENT OFFICE 2,547,838

RECORD BEARING MEDIUM AND METHODS OF PREPARATION

Edward Wriothesley Curzon Russell, Washington, D. C.

Application November 26, 1948, Serial No. 61,976
In Great Britain November 26, 1947

13 Claims. (Cl. 235—61.12)

This invention relates to a new and novel means for the recording of intelligence, and to methods of preparing said means.

The article comprising the invention, whether it be in the form of a tape, card, sheet, disc or the like, is characterized by having a surface of magnetic material thereon, from which surface portions of said material have been removed or otherwise caused to be absent according to a predetermined plan representative of what it is desired to record. If such a record is employed with conventional scanning equipment, the gaps or absent portions in the magnetic surface will afford characteristic and detectable magnetic variations representative of what has been recorded. These impulses may be employed to actuate telegraph printers, which ordinarily operate on punched tapes, or various business machines such as tabulating, printing and classifying equipment which ordinarily operate on the punched card system.

According to my methods of preparation of such records, the record may be coated with a suitable magnetic material, such as magnetic iron oxide, and then punched in standard telegraph or tabulating equipment, the coating being evenly magnetized either before or after the punching operation. Standard punched cards or telegraph tape may be the material thus coated and punched, whereas it is of course obvious that any suitable base material may be used.

The material thus punched and coated with a magnetized surface may thus be used directly, or it may be superposed on one or more layers of unpunched material, the combined article thus presenting surfaces which will carry ordinary printed matter or other visual material as well as intelligence to be derived by means of magnetic scanning.

An alternative article may be prepared by applying a masking material at suitable intervals upon the surface of a record, by means of a suitable stencil, and then applying a coating of magnetic material which may be removed from the masked portions. In this form of the invention gaps formed from the masked portions correspond to the gaps in the magnetized surface made by punching through the record material or a layer thereof.

It will be obvious that well-known methods and mechanisms may readily be adapted to effect magnetic scanning of almost any shape, form or size of document or record or of a document or record of almost any material, thickness or toughness. To convert, therefore, the impulses represented by a punched-card or punched telegraph tape to the form of this invention extends the usefulness of punched card or printing telegraph equipment. For records according to this invention are not restricted in size or shape, form or texture as are other forms of record such as punched cards, telegraph tape, magnetic recording tape, discs, magnetic wire etc. and are equally capable of operating tabulating or telegraphic equipment. With the aid of relatively cheap and simple scanning equipment, the invention makes available the many advantages of printing telegraphs and punched card tabulating equipment to the handling of a great variety of visual material and of documents of all shapes and sizes where, otherwise the use of separate cards of or lengths of loose tape would neither be convenient nor practical. For example, magnetic representations of a plurality of punched cards may be affixed to or be a part of a document and by suitable magnetic scanning can be made to operate in sequence punched card equipment. Similarly, a considerable length of a magnetic representation of a punched telegraph tape may be affixed to or be a part of a document and can be made to operate printing telegraphs by means of suitable scanning methods (for example, if the representations were so affixed as to form a helical track with the document folded around a cylinder). These advantages particularly apply to documents which require to be sent from place to place, such as invoices, bills of lading, manifests, etc. and also to documents which are carried or handled by the public such as passport and other identification documents, transportation tickets, credit-cards, baggage-checks, etc.

My records, too, are applicable to the rapid location, classification, indexing, filing or cross-referencing of all kinds of records and data, whether written, printed, photographed or microfilmed.

One of the basic advantages of this invention is that my records are not permanently impaired either by magnetic transference in folding or by accidental exposure to magnetic fields. If their magnetism deteriorates for any reason, their usefulness may be immediately restored by even remagnetisation.

Another basic advantage of this invention is that, since it enables magnetic "facsimiles" of punched-cards, punched telegraph tape and the like to be simply and cheaply made, it affords economies in the use of telegraph circuits and promotes efficiency in the use of punched-card equipment. For my record may be scanned and transmitted by wire or radio and, at the distant end, may be copied by known magnetic recording methods at speeds greatly in excess of those at which printing telegraphs or punched card equipment can operate. In this way the length of time in which transmission circuits are occupied is reduced and, at the receiving end, the quickly-made magnetic copy-record can be retained until equipment is available to transcribe or tabulate it at normal speed. Thus the load on expensive equipment may be efficiently spaced or distributed. The invention, therefore, offers a cheap and simple means of extending the usefulness of slow-moving mechanisms of many kinds.

Another basic advantage of this invention in all its forms is that records may be copied by non-magnetic as well as by magnetic means. Mechanical, chemical, electrolytic, photographic and lithographic methods may be employed to make copies of my magnetic records, which is particularly useful when a large number of copies is required. Such copies too, may also be scanned photoelectrically as well as magnetically, if desired. This invention, therefore, affords a link between the magnetic, photographic and photoelectric arts.

Other and further advantages of the invention will be described with reference to the drawing wherein.

Figures 1, 2:
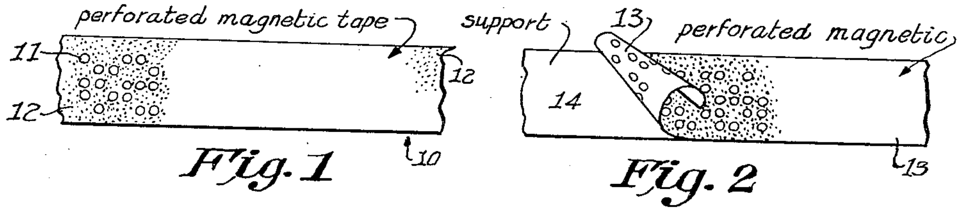
Fig. 1 represents the invention in the form of punched magnetic tape.
Fig. 2 shows the invention in the form of a punched magnetic tape superposed on a support of unpunched material.

In Fig. 1, I show my invention in the form of a tape 10 having sufficient width for five punched holes such as holes 11, and having a coating of evenly magnetized material 12, such as iron oxide (in a suitable binder, such as lacquer, if necessary). The tape shown is similar in appearance and width to the standard punched tape used in telegraph printers, and hence can be cut by the same mechanism. According to the method of preparation, the holes 11 may be impressed before or after applying the coating 12. The coating 12 may be evenly magnetized after application to the tape either before or after the holes 11 are punched.

Figure 7:
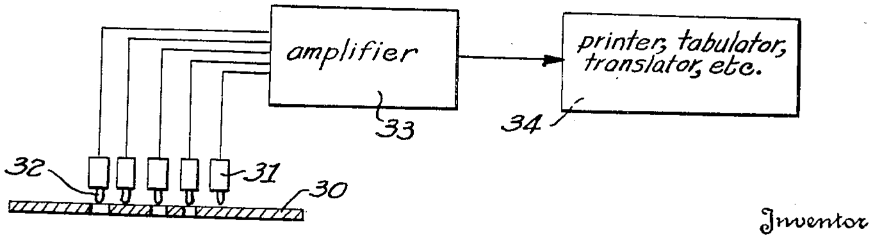
Fig. 7 illustrates diagrammatically the scanning of a tape prepared according to the invention.

By passing a tape of this description beneath a five-head magnetic scanner such as diagrammatically illustrated in Fig. 7, it is obvious that the discontinuity in the magnetism of the tape caused by the passage of the holes 11 beneath the scanner, will create electrical impulses which can be employed to control translating or printing equipment.

One of the special disadvantages of standard telegraph tape is that the holes punched therein must remain in the tape as used so that the necessary electrical impulses may pass through the holes as the tape moves over electric contact fingers. The presence of such holes prevents the tape from being useful to carry additional printed matter, for example, a typed line of characters translating the coded intelligence contained in the punched holes.

In Fig. 2, I show a tape of my invention, the upper layer 13 of which may be prepared as previously described for tape 10 of Fig. 1. Since a gap or hole in the tape is, according to my invention, only one of the methods which may be used to produce gaps in an otherwise evenly magnetized surface, the upper layer 13 of tape may be affixed, as by a suitable adhesive, to an unpunched support 14. Support 14 may be merely a strip of unpunched tape. This two-ply tape retains the magnetic characteristics of upper layer 13, and will also offer an unbroken upper or lower face upon which may be printed or inscribed any visual information desired.

Figure 3:
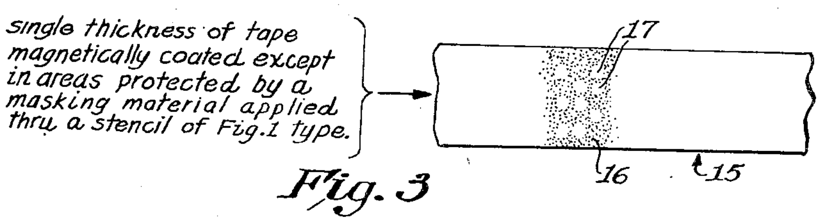
Fig. 3 shows the invention in the form of tape prepared with masking material to provide magnetic gaps.

Fig. 3 shows a tape 15 prepared according to another method. Tape 15 may be prepared by superposing upon it a punched tape (similar to tape 10 in Fig. 1, or similar to a standard non-magnetic punched tape) and using the same as a stencil through which to apply a masking material, such as a soluble wax to the tape 15. The masking material will settle on the tape according to the pattern of intelligence impressed in the stencil tape. Thereafter, a coating of magnetic material 16 in a suitable binder is applied to tape 15. This coating is later removed from the areas on which the masking material was applied by applying to the tape a suitable solvent for the masking material. The solvent selected should, of course, be one which has no effect on the magnetic coating. If wax is used as the masking material, a suitable solvent would be benzene. The solvent will leave areas 17 which are devoid of magnetic material. The remainder of the magnetic material is then evenly magnetized. The final tape will operate in the same manner as above described, and has the same advantage of the tape of Fig. 2 in that it presents an unpunched surface.

Figure 4:
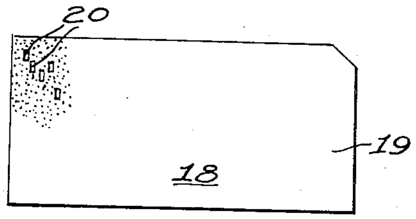
Fig. 4 represents the invention in the shape of a tabulating card with magnetic gaps formed by punching.

In Fig. 4 the invention is shown in the form of a card 18 suitable for use with known punched-card tabulating machinery. Card 18 may be made by the same method employed for tape 10 of Fig. 1, it having a surface of evenly magnetized material 19, interrupted by punch holes 20. Holes 20 may be produced by the same machinery used for punching standard punched cards.

Figure 5:
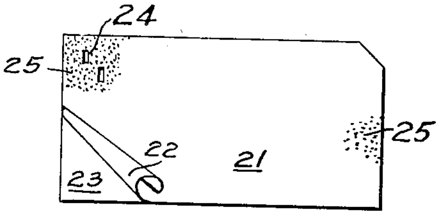
Fig. 5 shows a similar card superposed on a support of unpunched material.

In Fig. 5 the card 21 having an upper ply 22 which may be as thin or thick as desired, is formed similarly to the tape of Fig. 2. Ply 22 is punched with punches 24 after the manner of card 18, a coating of magnetic material 25 is applied and the ply 22 is superposed and secured to a support 23 having no holes. Material 25 is evenly magnetized at any time after application to the upper ply 22.

The card 21 thus affords an article which has a wider field of use than an ordinary punched card. If the card, for example, were used as a passport it could contain visual matter concerning the bearer, and the coded material represented by the interruptions in the magnetized surface could be reproduced at immigration stations by means of a magnetic pickup operating standard interpreting equipment. Alternatively a plurality of such cards either suitably linked together or forming part of a larger document could be used.

Figure 6:
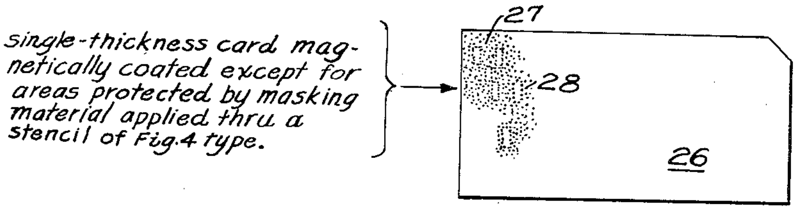
Fig. 6 shows a tabulating card, the magnetic gaps whereof are formed by applying a masking material.

The card 26 of Fig. 6 is prepared in a manner similar to the method of making tape 15 of Fig. 3, or by any other chemical method suited to obtain the same result. For example, a punched stencil, which may be a card such as card 18, is superposed on card 26 and masking material such as a soluble wax is applied through the holes. Magnetic material 27 in a suitable binder is then applied. Finally, a solvent for the masking material, such as benzene, is applied which will remove the masking material and any magnetic material which has settled on the areas to which the masking material was applied, thus leaving gaps or areas 28 devoid of magnetism. Material 27 is then evenly magnetized.

As indicated above, any of the various forms of records in accordance with the principles of my invention may be reproduced or sensed in various different ways. For example, a magnetic record formed by punching holes in a strip or card coated with a uniformly magnetized material (such as shown in Figs. 1 or 4) may be sensed either by contact fingers, in the conventional manner of punched tape or card sensing machines, or by photoelectric means, or equivalent structures. In Fig. 7 of the drawings I have illustrated in schematic form a sensing device which performs under the magnetic control of the record material, numeral 30 designating a piece of the magnetic tape for example of the forms shown in any of Figs. 1 to 3. In Fig. 7, the tape is illustrated as though it were passing into the plane of the drawing, so that the five perforations, or such lesser number as serve to carry the coded intelligence, lie from left to right of the strip 30.

Above the record element 30 I have shown diagrammatically a row, herein of five, sensing magnets or solenoids 31 each having a pole piece 32 arranged to lie above one of the rows in which perforations are formed. It is clear that as the record material passes beneath these sensing solenoids or pick-ups, the presence or absence of magnetic material on the record material will make itself felt as a change in the magnetic flux produced in the coils of the solenoids 31, which produces an output voltage or current that may be suitably amplified as by a conventional multichannel amplifier of known electronic construction, designated by numeral 33, and the output or outputs of this amplifier may then be utilized directly to control the operation of a printer, tabulator, interpreter or other utilization device designated broadly in Fig. 7 by numeral 34.

While the change in flux produced as an area of non-magnetized record material, or a punched hole, passes over each pick-up may be used directly to produce an output voltage or current, it is within the scope of my invention to provide a biasing flux, such as an alternating magnetic flux, either by alternating the magnetic flux used to magnetize the surface of the record material, or preferably by furnishing each of the pick-up coils 31 with a component of a suitable alternating current, for example, in the range of audio frequencies, in which case the effective reluctance of each magnetic circuit including one of the pick-up coils 31 will be varied as the punched or otherwise coded magnetic record material passes therebeneath. The particular details of the sensing or reproducing mechanism employed may be widely varied, such details as are shown in Fig. 7 being intended merely as exemplary of various possible arrangements for the purpose.

In the foregoing, I have suggested magnetic iron oxide in a suitable binder, such as lacquer, as a suitable material to be evenly magnetized according to the invention: there are, of course, other magnetizable materials and other binders well known to those skilled in the art. Also, when referring to the step of evenly magnetizing the magnetic coating of my record, I refer to known methods of magnetizing a coating such as by exposing it to the field of a permanent or electromagnet.

In my method of removing magnetic material by chemical means I have suggested a masking material of soluble wax to be removed by a solvent such as benzene. Likewise, the selection of other suitable masking materials and solvents is a matter of choice and substitutes are known in the chemical arts.

In certain of the claims which follow, the term "recording area" is used, which will be understood to mean that part of the record which is intended to be scanned by whatever scanning mechanism is employed, in other words, the "recording area" does not include any marginal areas of such records which would not be scanned. In some of the claims, the term "index point position" is used: this is intended to designate the space, interval, or spot which (by means of suitable apparatus) conveys a signal which is translated into intelligence. In the case of applicant's invention the index point position is such as space or interval from which magnetic or magnetizable material is caused to be lacking.

I claim:

1. A magnetic record having its recording area covered by an evenly magnetized material interrupted at selected intervals by non-magnetic spaces which are devoid of magnetized or magnetizable material.

2. A magnetic record having its recording area covered by a magnetizable material interrupted at selected intervals by non-magnetic spaces devoid of magnetizable material.

3. A magnetic record having selected spaces in its recording area devoid of magnetic or magnetizable material, said spaces being surrounded by an evenly magnetized material covering the remainder of said recording area.

4. A magnetic record comprising a base and a coating of evenly magnetized material covering the recording area except where, said material is interrupted at selected intervals by holes punched through the coating and the base, said holes providing index point positions devoid of magnetism.

5. A magnetic record comprising a base layer having an even surface and an upper layer attached to the base layer, said upper layer having a recording area covered by a coating of evenly magnetized material except where said material is interrupted at selected intervals by holes punched through the said upper layer in said recording area, said holes providing index point positions devoid of magnetism.

6. A magnetic record comprising a base and a recording area carrying a coating of evenly magnetized material except where said material is interrupted at selected intervals by spaces from which said magnetic material has been chemically removed, said spaces providing index point positions devoid of magnetism.

7. The method of preparing a magnetic record consisting of applying a coating of magnetic material to a support, removing selected portions of said magnetic material at selected intervals to leave said intervals incapable of magnetization, and applying an even magnetization to the remaining magnetic material.

8. The method of preparing a magnetic record consisting of supplying a suitable supported layer of magnetic material, removing selected portions of said material by punching holes through said layer, and applying an even magnetization to the remaining magnetic material.

9. The method of preparing a magnetic record consisting of punching holes in a suitable support at selected intervals, applying a coating of magnetic material, and applying an even magnetization to said material.

10. The method of preparing a magnetic record consisting of applying a coating of magnetic material to a suitable base, removing selected portions of said material by chemical means, and applying an even magnetization to the remainder of said coating.

11. The method of preparing a magnetic record consisting of applying a masking material to selected portions of a suitable base, applying a coating of magnetic material, applying a solvent to remove said masking material and any magnetic material thereon, and applying an even magnetization to the remainder of said magnetic material.

12. A magnetic record having a recording area of evenly magnetized material except where said material is interrupted at selected intervals by holes punched through said material, said holes providing index point positions devoid of magnetism.

13. The method of preparing a magnetic record consisting in supplying a suitably supported layer of magnetic material, removing selected portions of said magnetic material at selected intervals to leave said intervals incapable of magnetization, and applying an even magnetization to the remaining magnetic material.

EDWARD WRIOTHESLEY
CURZON RUSSELL.

REFERENCES CITED

The following references are of record in the file of this patent:

UNITED STATES PATENTS

| Number | Name | Date |
|---|---|---|
| 2,254,933 | Bryce | Sept. 2, 1941 |
| 2,288,862 | Weitmann et al. | July 7, 1942 |